(12) United States Patent
Kokubo et al.

(10) Patent No.: US 8,360,497 B2
(45) Date of Patent: Jan. 29, 2013

(54) LOCK MECHANISM FOR ELECTRIC RETRACTABLE SEAT FOR VEHICLE

(75) Inventors: Motohiro Kokubo, Kariya (JP); Kazuya Iwasa, Obu (JP); Hideki Fujisawa, Chiryu (JP); Hiroaki Hayahara, Seto (JP)

(73) Assignees: Aisin Seiki Kabushiki Kaisha, Kariya-Shi, Aichi-Ken (JP); Toyota Boshoku Kabushiki Kaisha, Kariya-Shi, Aichi-Ken (JP)

( * ) Notice: Subject to any disclaimer, the term of this patent is extended or adjusted under 35 U.S.C. 154(b) by 246 days.

(21) Appl. No.: 12/859,967

(22) Filed: Aug. 20, 2010

(65) Prior Publication Data

US 2011/0043017 A1 Feb. 24, 2011

(30) Foreign Application Priority Data

Aug. 21, 2009 (JP) ................. 2009-192550

(51) Int. Cl.
*B60N 2/08* (2006.01)
(52) U.S. Cl. ............... 296/65.09; 296/65.13; 296/65.16; 296/65.18; 297/15
(58) Field of Classification Search ............... 296/64, 296/66, 65.01, 65.05, 65.08, 65.09, 65.13–65.18; 297/15, 334, 337
See application file for complete search history.

(56) References Cited

U.S. PATENT DOCUMENTS

| 3,202,453 | A  | * | 8/1965  | Richards ................... 296/66 |
| 5,890,758 | A  | * | 4/1999  | Pone et al. ................ 297/15 |
| 5,975,612 | A  | * | 11/1999 | Macey et al. .............. 296/66 |
| 6,123,380 | A  | * | 9/2000  | Sturt et al. ............... 296/65.09 |
| 7,077,463 | B2 | * | 7/2006  | Sun et al. ................ 297/15 |
| 7,290,822 | B2 | * | 11/2007 | Villeminey .............. 296/65.09 |
| 7,431,372 | B2 | * | 10/2008 | Imamura et al. ......... 296/65.09 |
| 7,686,389 | B2 | * | 3/2010  | Yamada ................... 297/15 |
| 7,695,058 | B2 |   | 4/2010  | Satta et al. |
| 7,914,062 | B2 | * | 3/2011  | Iwasa et al. ............. 296/65.09 |
| 8,177,279 | B2 | * | 5/2012  | Wada et al. ............. 296/65.01 |
| 2008/0224518 | A1 | * | 9/2008 | Yamada et al. ........... 297/313 |
| 2010/0019526 | A1 | * | 1/2010 | Wada et al. ............. 296/66 |
| 2011/0043017 | A1 | * | 2/2011 | Kokubo et al. .......... 297/337 |

FOREIGN PATENT DOCUMENTS

JP 2007-062510 A 3/2007

* cited by examiner

*Primary Examiner* — Glenn Dayoan
*Assistant Examiner* — Gregory Blankenship
(74) *Attorney, Agent, or Firm* — Buchanan Ingersoll & Rooney

(57) ABSTRACT

A lock mechanism for an electric retractable seat for a vehicle, includes a seat cushion frame, a seat back frame, a guide groove, a latch including an engagement opening portion, a slide member disengaging from the engagement opening portion when the latch is in an unlocked position, engaging with the engagement opening portion during a movement of the seat cushion frame to the seating position, and being locked between the guide groove and the engagement opening portion when the latch is in a locked position, a pawl for restricting the latch from pivoting when the pawl is in a restricted position, and allowing the latch to pivot when the pawl is in a released position, a releasing member for rotating the pawl.

4 Claims, 13 Drawing Sheets

LOCK MECHANISM FOR ELECTRIC RETRACTABLE SEAT FOR VEHICLE

CROSS REFERENCE TO RELATED APPLICATIONS

This application is based on and claims priority under 35 U.S.C. §119 to Japanese Patent Application 2009-192550, filed on Aug. 21, 2009, the entire content of which is incorporated herein by reference.

TECHNICAL FIELD

This disclosure relates to a lock mechanism for an electric retractable seat for a vehicle.

BACKGROUND DISCUSSION

Conventionally, an electric retractable seat for a vehicle is provided with a motor for unlocking the electric retractable seat that is fixed (locked) relative to the vehicle, and the seat is unlocked by means of the motor.

For example, an electric retractable seat apparatus disclosed in JP2007-062510A is provided with an unlock motor for unlocking a seat cushion that is fixed to the vehicle so as to stay in a seating position. The seat cushion is supported at the vehicle floor by means of a front leg and a rear leg. Locking devices each provided on the front leg and the rear leg engage with strikers provided to the vehicle, thereby locking the seat cushion relative to the vehicle. To unlock the seat cushion, the unlock motor is driven to disengage the locking devices from the strikers, which allows the seat cushion to move.

However, the electric retractable seat apparatus disclosed in JP2007-062510A is provided with the unlock motor, in addition to a seat back motor and a seat cushion motor for retracting the seat back and the seat cushion respectively. This requires a large accommodation space and a high cost.

A need thus exists for a lock mechanism for an electric retractable seat for a vehicle, which is not susceptible to the drawback mentioned above.

SUMMARY

According to an aspect of this disclosure, a lock mechanism for an electric retractable seat for a vehicle includes a seat cushion frame reciprocately moving between a seating position and a retracted position by a driving of a second electric motor, a seat back frame pivoting between a standing position and a forward-tilted position by a driving of a first electric motor, and a pair of links provided at both end portions of the seat cushion frame in a lateral direction of the vehicle, one end of each link being adapted to be pivotably connected to a vehicle floor and the other end of each link connected to a front portion of the seat cushion frame. The lock mechanism for the electric retractable seat for the vehicle also includes a guide member adapted to be arranged on the vehicle floor and including a guide groove formed to extend between the seating position and the retracted position and a guide wall member formed along a longitudinal direction of the vehicle. The lock mechanism for the electric retractable seat for the vehicle also includes a slide member arranged at a rear end portion of the seat cushion frame and slidably engaging with the guide groove formed on the guide member, and a latch supported at the guide wall member in a pivotable manner between an unlocked position and a locked position and including an engagement opening portion engaging with and disengaging from the slide member. The slide member disengages from the engagement opening portion when the latch is in the unlocked position, and engages with the engagement opening portion and pivots the latch to the locked position during a movement of the seat cushion frame to the seating position. The slide member is locked between one of end portions of the guide groove which is located more proximate to the seating position than the other one of the end portions of the guide groove and the engagement opening portion when the latch is in the locked position. The lock mechanism for the electric retractable seat for the vehicle also includes a latch engagement member formed integrally with the latch, a latch biasing member biasing the latch in a direction from the lock position to the unlocked position, and a pawl supported at the guide wall member in a pivotable manner between a restricted position and a released position and including a restricting portion. The restricting portion faces the latch engagement member leaving a slight space therebetween for restricting the latch in the locked position from pivoting in a direction to the unlocked position when the pawl is in the restricted position. The restricting portion allows the latch to pivot in the direction to the unlocked position when the pawl is in the released position. The lock mechanism for the electric retractable seat for the vehicle also includes a pawl engagement member formed integrally with the pawl, a pawl biasing member biasing the pawl in a direction from the released position to the restricted position, and a releasing member provided on the seat back frame and pushing the pawl engagement member to rotate the pawl to the released position and retain the pawl in the released position while the seat back frame is pivoting from the standing position to the forward-tilted position.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
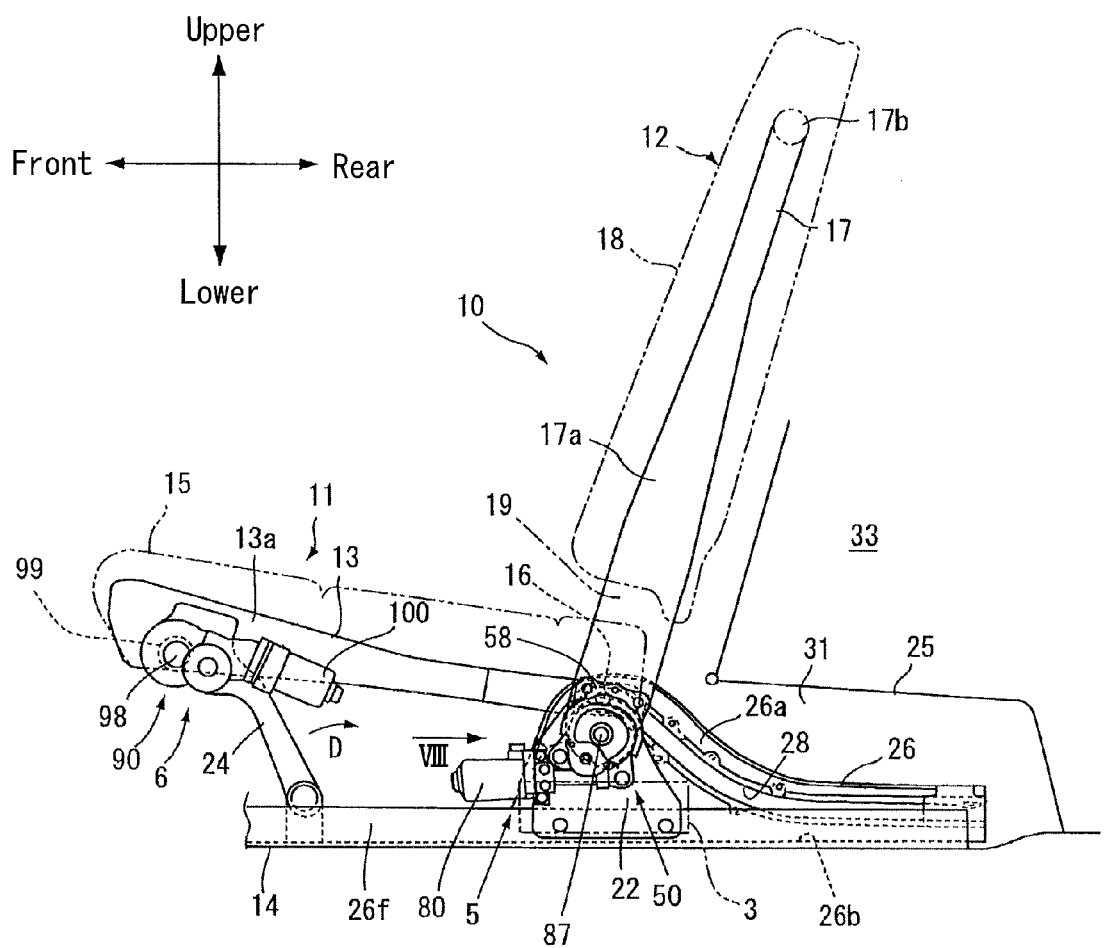
FIG. 1 is a lateral view of a seat cushion for a vehicle according to an embodiment disclosed here, which is in a seating position.
Figure 2:
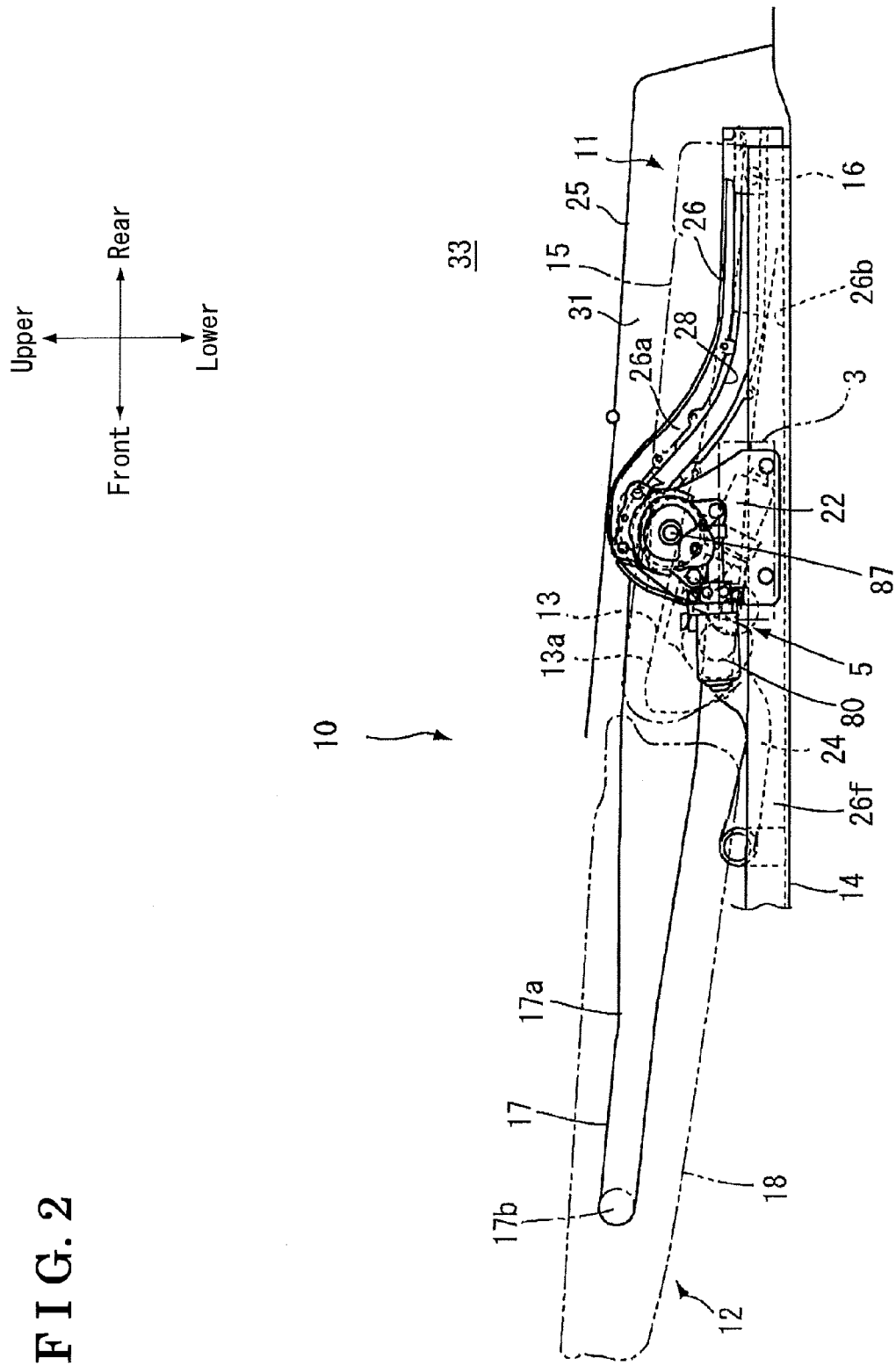
FIG. 2 is a lateral view of the seat cushion, which is in a retracted position.

An embodiment of this disclosure will be explained with reference to illustrations of drawings as follows. FIG. 1 is a lateral view of a seat 10 for a vehicle when a seat cushion 11 is in a seating position. FIG. 2 is a lateral view of the seat 10 when the seat cushion 11 is in a retracted position.

The seat 10 according to the embodiment is suitable for being applied to a rear seat attached to a rearmost portion of a station wagon, a minivan, and the like. The seat 10 is arranged at an upper portion of a floor 14 (a vehicle floor 14) of the vehicle. The whole floor 14 is formed in a flat shape. Further, in the embodiment, longitudinal (front and rear), lateral (left and right) and vertical (upper and lower) directions of the seat 10 are identical to the directions of the vehicle as illustrated in the attached drawings.

The seat 10 includes the seat cushion 11 on which an occupant sits, a seat back 12 supporting a back of the occupant sitting on the seat cushion 11, a first drive unit 5 for the seat back 12, a second drive unit 6 for the seat cushion 11, a control unit 3 controlling operations of the first drive unit 5 and the second drive unit 6, and a rail 26 (a guide member) at which a guide groove 28 is formed. The first drive unit 5 drives the seat back 12 to be pivoted between a standing position and a forward-tilted position by means of a first electric motor 80. The second drive unit 6 drives the seat cushion 11 to be moved between the seating position and the retracted position by means of a second electric motor 100. The seat cushion 11 arranged at the floor 14 is guided by the guide groove 28 of the rail 26 so as to be moved therealong to the seating position and the retracted position.

The seat cushion 11 includes therein a seat cushion frame 13 that forms a framework of the seat cushion 11. The seat cushion frame 13 includes a left and right pair of extensions 13a, 13a that are provided in lateral end portions of the seat cushion 11 and are extending in the longitudinal direction. Each extension 13a is formed into a plate shape and is arranged so that a thickness direction of the extensions 13a, 13a corresponds to the lateral direction of the vehicle. A plate-like connecting member extending in the lateral direction is provided between rear end portions of the extensions 13a, 13a so as to mechanically connect the extensions 13a, 13a to each other, and thus the seat cushion frame 13 is formed into a substantial U-shape when viewed from above. Each rear end portion of the extensions 13a, 13a is provided with a slide member 16 that is formed into a cylindrical shape. The slide member 16 is located so that an axis of the cylindrical shape is substantially parallel to the lateral direction of the vehicle. A torque rod 99 is rotatably provided between front end portions of the extensions 13a, 13a so as to connect the front end portions of the extensions 13a, 13a to each other.

The seat cushion 11 includes the seat cushion frame 13, a pad mounted on a spring provided on the seat cushion frame 13, and a cover material 15 covering the seat cushion frame 13, the spring and the pad. The seat cushion 11 is driven and moved by the second drive unit 6 between the seating position shown in FIG. 1 in which the occupant may be seated on the seat cushion 11, and a retracting space 31 shown in FIG. 2, that is the retracted position.

The seat cushion frame 13 is mounted on the floor 14 by means of a pair of links 24, 24 provided on a front portion of the seat cushion frame 13. Each link 24 is made of a long plate, and a lower portion of each link 24 is pivotably connected to the floor 14 and an upper portion of each link 24 is fixedly attached to the torque rod 99 that connects the front end portions of the extensions 13a, 13a to each other.

When the seat cushion 11 is in the seating position, each link 24 is raised in a forward tilted manner so as to support the seat cushion 11 in the seating position. When the seat cushion 11 is being moved from the seating position to the retracted position, each link 24 is pivoted about a pivot portion that is connected to the floor 14. Thus, the upper portion of the link 24 is moved rearward, that is, pivoted in the arrow direction D in FIG. 1, as the seat cushion 11 moves rearward, thereby guiding a front portion of the seat cushion 11 to move rearward.

Figure 3:
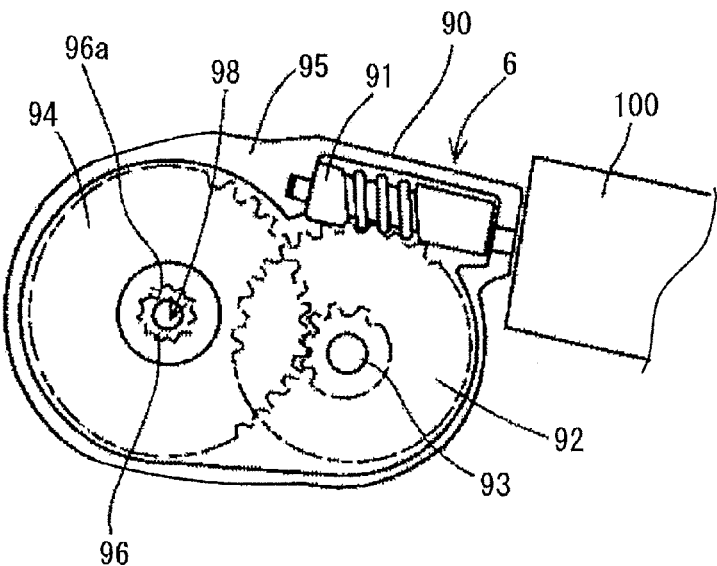
FIG. 3 is a perspective view of a gear of a second drive unit for the seat cushion according to the embodiment.

The second drive unit 6 is supported by one of the extensions 13a, 13a of the seat cushion frame 13. The second drive unit 6 includes the second electric motor 100 and a gear reduction mechanism 90. As shown in FIG. 3, the gear reduction mechanism 90 includes a worm gear 91 fixedly mounted to an end portion of an output shaft of the second electric motor 100, an input gear 92 engaging with the worm gear 91, a small gear 93 that rotates coaxially and synchronously with the input gear 92, an output gear 94 which has a larger diameter than that of the small gear 93 and which engages with the small gear 93, and a housing 95 for accommodating therein the above-described gears. As shown in FIG. 3, the output gear 94 includes a spline bore 96a engaging with a spline portion 96 of a drive shaft 98. The housing 95 is fixedly fastened to the one of the extensions 13a, 13a. The drive shaft 98 is connected to the torque rod 99. The second drive unit 6 is connected to the control unit 3.

The second electric motor 100 for moving the seat cushion 11 applies a rotating torque via the drive shaft 98 to the torque rod 99 and then to the link members 24, 24, thereby rotating the torque rod 99 clockwise in FIG. 1. Consequently, the slide members 16, 16 provided on the rear end portions of the extensions 13, 13 are slid and moved rearward while being guided by the guide grooves 28, 28, and thus the seat cushion 11 is moved to the retracted position as shown in FIG. 2.

The seating position of the seat cushion 11 refers to the position that allows the occupant to be seated on the seat cushion 11. When the seat cushion 11 is in the seating position, each slide member 16 is in contact with a front end portion of the guide groove 28 and is retained in this state by the second drive unit 6, and thus the seat cushion 11 is stationary stopped. The seat cushion 11 is restricted from moving rearward and retained in the seating position by means of engagement of the gears of the second drive unit 6.

The retracted position of the seat cushion 11 refers to the position where the seat cushion 11 is retracted behind the seating position of the seat cushion 11 so as to be located in a lower position than the seating position of the seat cushion 11, that is for example, in the retracting space 31 located under a deck board 25 that forms a floor of a luggage compartment 33.

As shown in FIG. 1, the seat back 12 includes a seat back frame 17 that forms a framework of the seat back 12. The seat back frame 17 includes a left and right pair of side portions 17a, 17a that are provided in lateral end portions of the seat back 12 and are extending in the vertical direction. Each side portion 17a is formed into a plate shape and is arranged so that a thickness direction of the side portion 17a corresponds to the lateral direction of the vehicle. A pipe-like connecting member 17b is provided between upper end portions of the side portions 17a, 17a so as to mechanically connect the side portions 17a, 17a to each other in the lateral direction, and thus the seat back frame 17 is formed into a substantial U-shape having an opening downward when viewed from the front. Each lower portion of the side portions 17a, 17a is disposed between a connecting plate 22 and the guide wall member 26a, and is pivotably connected to the connecting plate 22 via a shaft 87.

A seat reclining unit 50 is located on an outer side (the left side in this embodiment) of a connecting part where one of the connecting plates 22, 22 and the lower portion of the related side portion 17a are connected with each other. The seat reclining unit 50 is connected to the shaft 87, and supported by the connecting plate 22 and by the side portion 17a of the seat back frame 17. The seat reclining unit 50 adjusts a reclining angle of the seat back 12 relative to the seat cushion 11. The seat reclining unit 50 includes the first drive unit 5 driven by the first electric motor 80. The first drive unit 5 is located on the outer side of the seat reclining unit 50. The first drive unit 5 is connected to the control unit 3.

Figure 4:
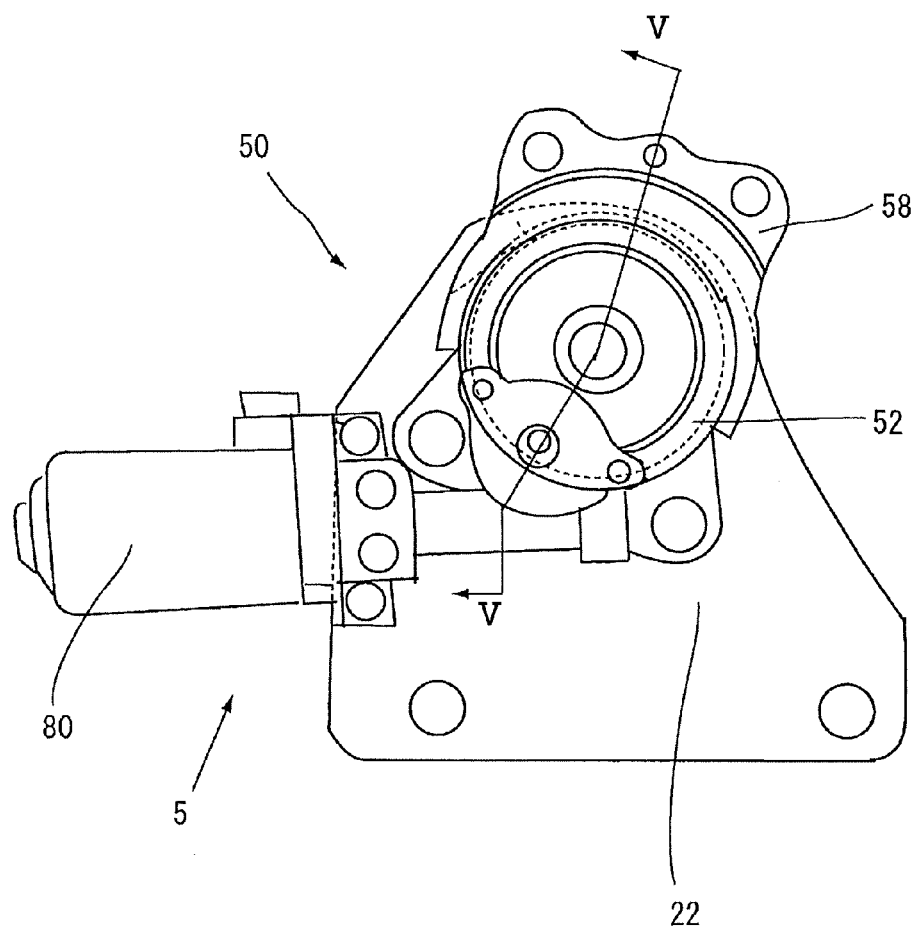
FIG. 4 is an enlarged view of a first drive unit for a seat back according to the embodiment.
Figure 5:
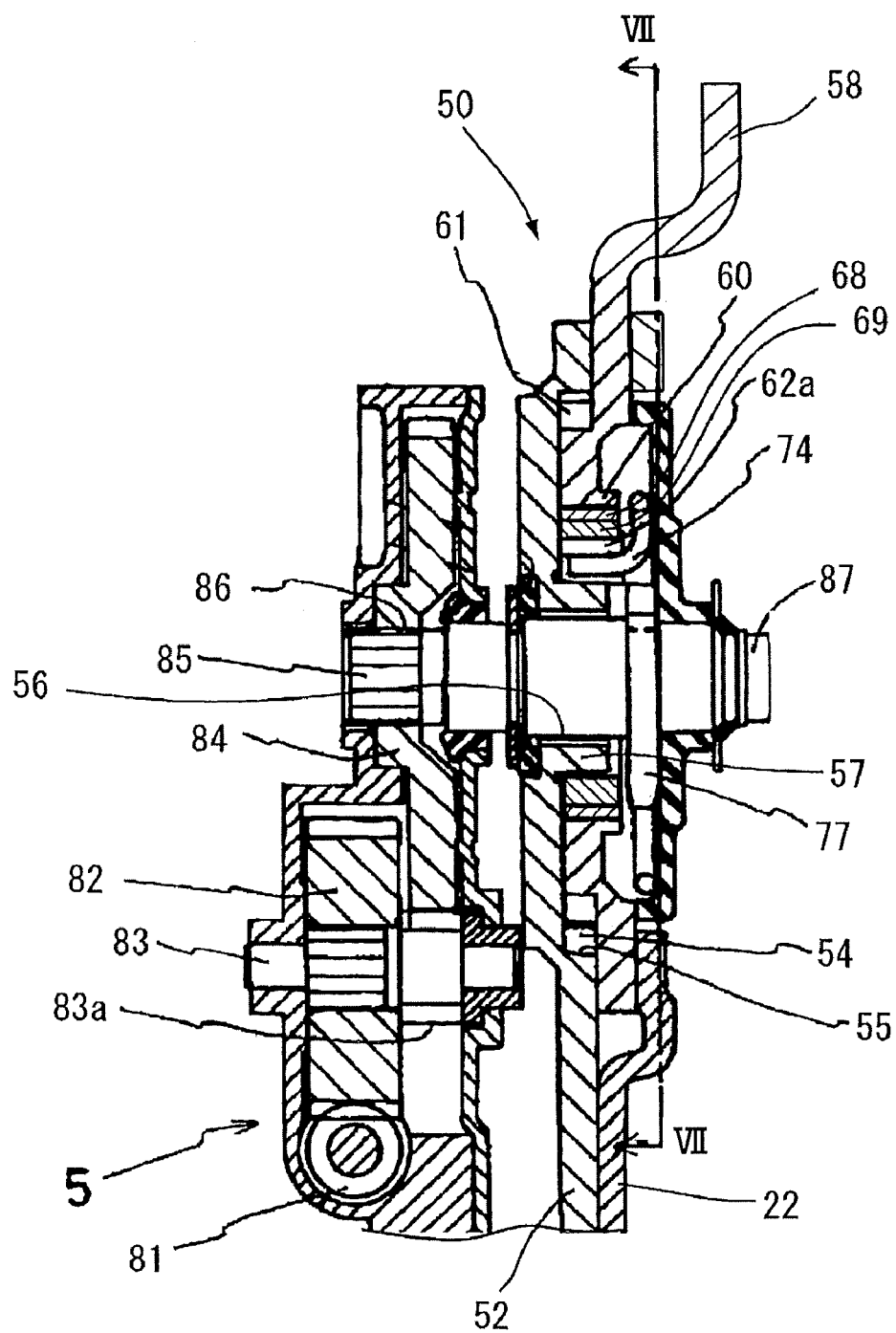
FIG. 5 is a cross-sectional view taken along the line V-V of FIG. 4.
Figure 6:
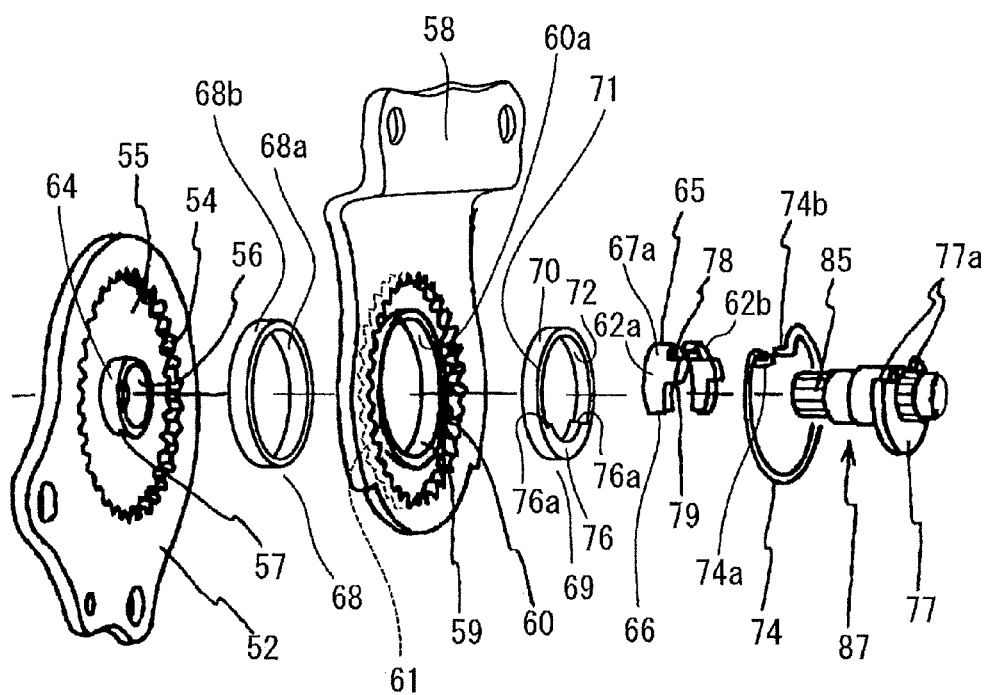
FIG. 6 is an exploded perspective view of a seat reclining unit for the seat back according to the embodiment.

The seat reclining unit 50 and the first drive unit 5 will be described below. As shown in FIGS. 4 and 5, a gear plate 52 of the seat reclining unit 50 is fixedly secured to the connecting plate 22. As shown in FIGS. 5 and 6, the gear plate 52 includes in a substantial center thereof a space 55 formed by a half blanking process. The space 55 is recessed relative to the remaining plain surface of the gear plate 52 and is provided with an internal gear 54 formed on an inner circumferential surface of the space 55. The space 55 includes a shaft hole 56 formed in the radial center of the space 55. The shaft hole 56 is provided with a burring 57 formed on a circumference of the shaft hole 56 so as to project in a direction that the space 55 opens.

An upper arm 58 of the seat reclining unit 50 is fixedly secured to the one of the frame 17a. As shown in FIGS. 5 and 6, the upper arm 58 includes in a substantial center thereof a protrusion of a circular shape formed by the half blanking process so as to protrude from the remaining plain surface of the upper arm 58. An external gear 61 is provided on an outer circumferential surface of the protrusion. A portion of teeth of the external gear 61 of the upper arm 58 are engaged with a portion of teeth of the internal gear 54 of the gear plate 52. The number of teeth of the external gear 61 is set to be slightly less than the number of teeth of the internal gear 54. The upper arm 58 includes a pivot shaft hole 59 formed in the center of the protrusion formed on the upper arm 58. The pivot shaft hole 59 is provided with a burring 60 formed on a circumference of the pivot shaft hole 59 so as to project in an opposite direction to the direction that the protrusion protrudes. A press-fit ring 68 is press-fitted in the pivot shaft hole 59 so that a shape of an inner circumferential surface 60a of the burring 60 and a shape of an outer circumferential surface 68b of the press-fit ring 68 are approximately the same. The press-fit ring 68 is integrally secured to the upper arm 58.

Figure 7:
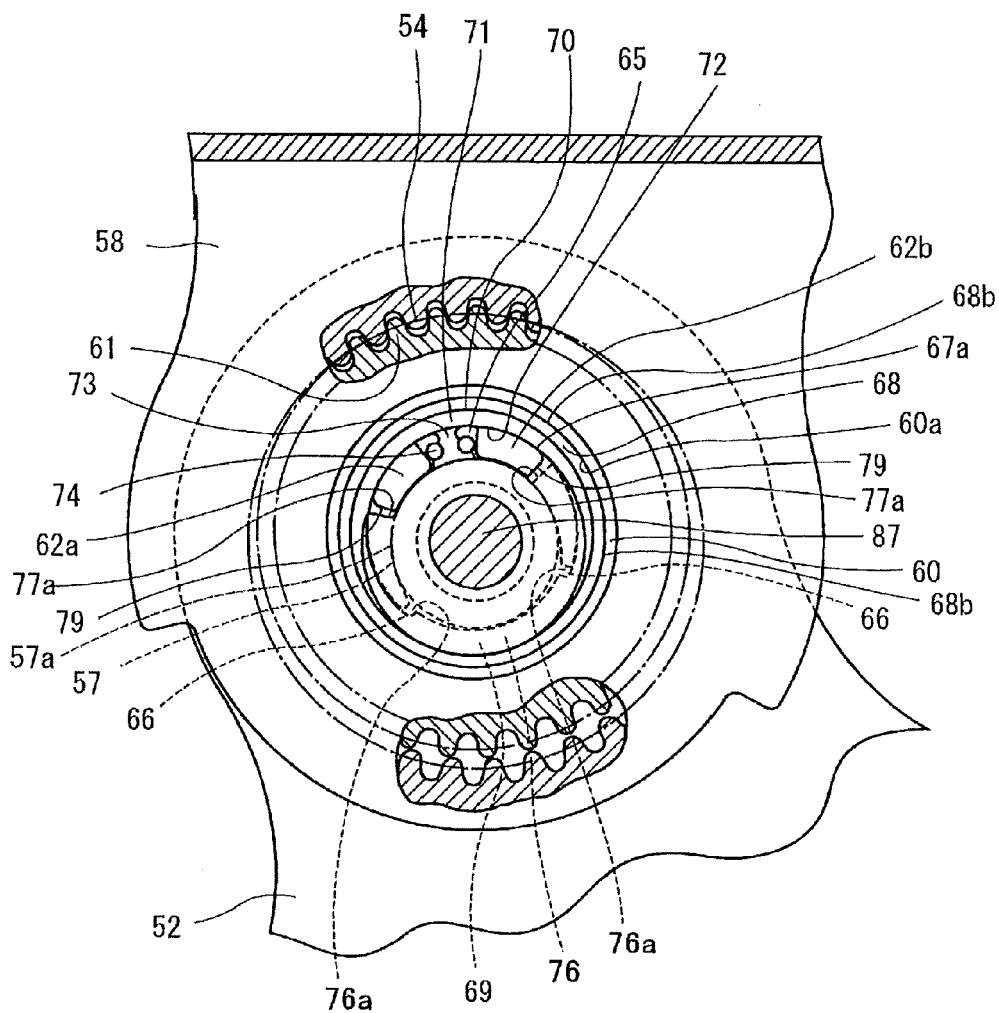
FIG. 7 is a cross-sectional view taken along the line VII-VII of FIG. 5.

An engagement of the internal gear 54 and the external gear 61 is retained by a pair of wedge members 62a, 62b. The pair of wedge members 62a, 62b is formed by two symmetric portions each having a substantial arc shape. The pair of wedge members 62a, 62b is disposed in a radial space formed between an outer circumferential surface 64 of the burring 57 and an inner circumferential surface 68a of the press-fit ring 68. The burring 57 is formed on the gear plate 52 so as to be concentric with the internal gear 54. The press-fit ring 68 is formed and press-fitted in the pivot shaft hole 59 so as to be eccentric with the outer circumferential surface 64 of the burring 57 and concentric with the external gear 61. The pair of wedge members 62a, 62b is arranged so as to leave a circumferential space 73 (see FIG. 7) between one circumferential end of the wedge member 62a and one circumferential end of the wedge member 62b. A radial thickness of each of the wedge members 62a, 62b increases toward the circumferential space 73. Thus, each of the wedge members 62a, 62b has a thick circumferential end portion 65 that is located closer to the circumferential space 73, and a thin circumferential end portion 66 that is located on the other circumferential end. The pair of wedge members 62a, 62b is formed into the arc shape so that an inner circumferential surface of each of the wedge members 62a, 62b slidably contacts with the outer circumferential surface 64 of the burring 57 formed on the gear plate 52, and so that an outer circumferential surface 67a of each of the wedge members 62a, 62b slidably contacts with the inner circumferential surface 68a of the press-fit ring 68. The outer circumferential surface 67a of each of the wedge members 62a, 62b serves as a friction surface and has the same shape as an inner circumferential surface 72 of a radially narrow portion 71 of a ring member 69. A radial clearance is formed between the inner circumferential surface of each of the wedge members 62a, 62b and the burring 57. The radial clearance becomes smaller toward the thick circumferential end portion 65. Thus, the inner circumferential surface of each of the wedge members 62a, 62b is in contact with the burring 57 in the vicinity of the thick circumferential end portion 65. The pair of wedge members 62a, 62b is arranged so as to cover a substantially half of the outer circumferential surface 64 of the burring 57 in the circumferential direction, leaving the circumferential space 73 between the wedge members 62a, 62b. In the circumferential space 73, a spring 74 is disposed so as to expand the circumferential space 73 in the circumferential direction. One end 74a of the spring 74 is in contact against the thick circumferential end portion 65 of the wedge member 62a and the other end 74b of the spring 74 is in contact against the thick circumferential end portion 65 of the wedge member 62b.

As shown in FIGS. 5 and 6, the ring member 69 made of metal is provided on the outer circumferential surface 67a of the wedge members 62a, 62b. The ring member 69 includes the radially narrow portion 71, and a radially wide portion 76 formed into a fan shape or a sector shape that inwardly extends beyond the radially narrow portion 71 in the radial direction. The outer circumferential surface 70 of the ring member 69 forms a cylindrical slide contact surface that is slidable along the inner circumferential surface 68a of the press-fit ring 68, and is concentric with the inner circumferential surface 68a of the press-fit ring 68. The radially narrow portion 71 has a uniform thickness along the circumferential direction, that is, the inner circumferential surface 72 and the outer circumferential surface 70 are concentric with each other. The inner circumferential surface 72 of the radially narrow portion 71 is formed so as to contact along the outer circumferential surface 67a of the wedge members 62a, 62b. Each of end faces 76a, 76a of the radially wide portion 76 come in contact with each of the thin circumferential end portions 66, 66 of the wedge members 62a, 62b.

As shown in FIGS. 5 and 6, the shaft 87 is rotatably inserted in the shaft hole 56 formed on the gear plate 52. A cam 77 is provided on an end portion of the shaft 87, and is formed into a flat disk shape having a fan-shaped notch. The fan-shaped notch is formed by cutting off a portion of the circumference of the flat disk so that the fan-shaped notched portion opens outward in the radial direction. A protrusion 78 is formed on an axial end face of each of the wedge members 62a, 62b so as to protrude in the axial direction beyond the burring 60 of the upper arm 58 and an axial end surface of the press-fit ring 68. When the shaft 87 rotates in one direction, a circumferential end face 77a formed on the cam 77 comes in contact with a circumferential end face 79 of the protrusion 78 of either one of the wedge members 62a and 62b, for example the wedge member 62a. Thus, the wedge member 62a is moved in the circumferential direction against the spring force of the spring 74, thereby decreasing the circumferential space 73 in the circumferential direction. When the shaft 87 rotates in the other direction, the other one of the wedge members 62a, 62b is moved, thereby decreasing the circumferential space 73 in a similar way.

Consequently, a frictional engagement between the outer circumferential surface 67a of the wedge members 62a, 62b and the inner circumferential surface 72 of the ring member 69 is released, which allows a position of the engagement between the internal gear 54 and the external gear 61 to shift. When the shaft 87 further rotates, the circumferential space 73 between the thick circumferential end portions 65, 65 of the wedge members 62a, 62b is further decreased. While the circumferential space 73 is maintained in a decreased state, the wedge members 62a, 62b are rotated about a rotation axis of the shaft 87 in the same direction as the shaft 87 rotates. The center of the ring 69 is located to be eccentric with respect to the rotation axis of the shaft 87 because of the pair of wedge members 62a, 62b, whose radial thickness is circumferentially uneven. Consequently, as the pair of wedge members 62a, 62b is rotated about the shaft 87, the ring member 69 orbits around the rotation axis of the shaft 87. The internal gear 54 formed on the gear plate 52 is concentric with the burring 57 that is also formed on the gear plate 52, and the center of the internal gear 54 lies on the rotation axis of the shaft 87.

Further, as the pair of wedge members 62a, 62b, whose radial thickness is circumferentially uneven, exists between the press-fit ring 68 and the burring 57, the center of the internal gear 54 formed on the gear plate 52 is eccentric with respect to the center of the external gear 61 formed on the upper arm 58. Consequently, as the ring member 69 orbits around the rotation axis of the shaft 87, the external gear 61 formed on the upper arm 68 rotates with respect to the internal gear 54 formed on the gear plate 52. Thus, the position of the engagement between the internal gear 54 and the external gear 61 shifts.

Then, the thin circumferential end portion 66 of the wedge member 62b comes in contact with one of the end faces 76a, 76a of the ring member 69. As the pair of wedge members 62a, 62b is further rotated, the wedge member 62b, which is being moved by the wedge member 62a and being in contact with the one of the end faces 76a, 76a, pushes the ring member 69 in the circumferential direction. The ring member 69, together with the pair of wedge members 62a, 62b, starts rotating relative to the burring 57 of the gear plate 52. When the ring member 69 is rotated, the outer circumferential surface 70 of the ring member 69 slides in the circumferential direction along the inner circumferential surface 68a of the press-fit ring 68 that is integrally secured to the upper arm 58. Consequently, the external gear 61 eccentrically rotates with respect to the axis of the internal gear 54. Thus, the position of the engagement between the internal gear 54 and the external gear 61 shifts. Every time the shaft 87 completes one rotation, the upper arm 68 pivots relative to the gear plate 52 by an angle that corresponds to a difference in the number of teeth between the external gear 61 and the internal gear 54. As a result, the reclining angle of the seat back 12 relative to the seat cushion 11 fixedly mounted on the floor 14 is adjusted.

As illustrated in FIG. 5, The first drive unit 5 is fixedly attached to the connecting plate 22. The first drive unit 5 includes the first electric motor 80 serving as a drive source of the first drive unit 5, and a gear reduction mechanism that includes a worm gear 81, a worm wheel 82, a pinion gear 83 and a gear 84. The first drive unit 5 transmits a rotation produced by the first electric motor 80 to the gear 84, the gear functioning at the final phase of the reduction mechanism.

The gear 84 includes in the center thereof a serration 86 that engages with a serrated portion 85 formed on the shaft 87. The first electric motor 80 rotates the shaft 87 in the normal direction and the reverse direction when the occupant operates a switch. When the first electric motor 80 rotates in one direction, a rotation torque is transmitted to the shaft 87 through the gear reduction mechanism.

The seat back 12 includes the seat back frame 17, a back pad that may be elastically deformed by a load applied thereto via a back mat, and a cover material 18 covering the seat back frame 17, the back pad and the back mat. As illustrated in FIG. 1, a recess 19 is formed on a lower end portion of the back pad so as to prevent the seat cushion 11 from interfering with the seat back 12 when the seat cushion 11 is moved between the seating position and the retracted position.

The standing position of the seat back 12, as described above, refers to the position of the seat back 12 that allows the occupant to be seated on the seat cushion 11 and allows the seat back 12 to support a back of the occupant. The standing position of the seat back 12 includes any reclining positions that the occupant may select when seated. The forward-tilted position of the seat back 12 refers to the position of the seat back 12 when it is arranged forward to the seat cushion 11 that is in the retracted position.

As described above, the first drive unit 5 and the second drive unit 6 are controlled by the control unit 3 so that the seat cushion 11 and the seat back 12 are moved at an optimal timing between the seating position and the retracted position, and between the standing position and the forward-tilted position, respectively.

The pair of rails 26, 26 serving as the pair of guide members is provided for fastening the seat cushion 11 to the floor 14 and is extending from the lateral sides of the retracting space 31 to the vicinity of the pair of links 24, 24. Each of the rails 26, 26 is provided with a guide wall member 26a that is formed into a long plate shape and is extending in the longitudinal direction. When the seat cushion 11 is in the retracted position, the guide wall member 26a faces the lateral portion of the seat cushion 11.

Figure 8:
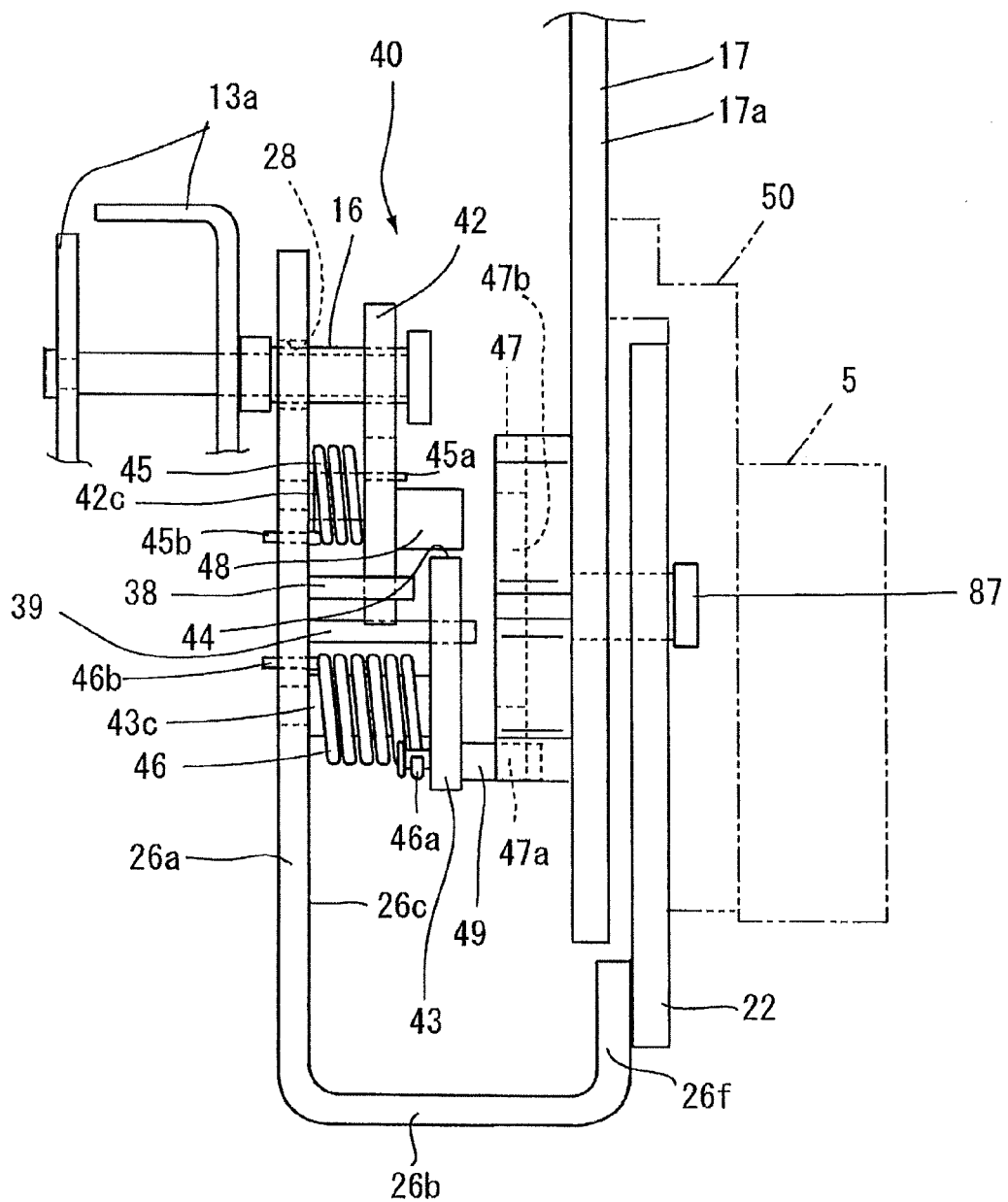
FIG. 8 is a cross-sectional view of a lock mechanism according to the embodiment, which is seen from the direction VIII of FIG. 1.

As shown in FIG. 8, a fastening portion 26b is formed on a lower end portion of each guide wall member 26a so as to extend away from the seat cushion 11 in the lateral direction of the vehicle. The fastening portions 26b, 26b are fastened to the floor 14 by means of fasteners, and thus the rails 26, 26 are securely fastened to the floor 14.

A connecting portion 26f having a long plate shape is formed on a lateral end face of each fastening portion 26b so as to extend upward. A lower end portion of the connecting plate 22, which is formed into a plate shape, is fixedly fastened to each connecting portion 26f so that the connecting plate 22 and the connecting portion 26f are attached to each other in a thickness direction. The connecting plates 22, 22 allow the seat back 12 to be supported by the floor 14. The connecting plates 22, 22 are arranged along the longitudinal direction of the seat 10 so as to face the guide wall members 26, 26, respectively.

Each guide wall member 26a is provided with the guide groove 28 (that is, a long hole). The guide groove 28 is formed by fitting a resin member into the long hole on the guide wall member 26a for improving a frictional performance, a sliding performance and so forth. The guide groove 28 includes a moderate slope portion located in a front end of the guide groove 28, a horizontal portion located in a rear portion of the guide groove 28, and a slope portion located between the moderate slope portion and the horizontal portion. The horizontal portion is located near the floor 14 so as to extend substantially horizontally to the floor 14. The moderate slope portion is located to be higher than the horizontal portion and moderately slopes downwardly relative to the floor 14 toward the rear direction. The slope portion slopes downwardly toward the rear direction. Each of the slide members 16, 16 that are formed into the cylindrical shape and provided on left and right rear end portions of the seat cushion frame 13 engages with the guide groove 28 of each guide wall member 26a in a manner that the slide member 16 is allowed to move and restricted from moving in the guide groove 28. Thus, a rear end portion of the seat cushion 11 is connected to the floor 14 via the pair of rails 26, 26. The rear end portion of the seat cushion 11 is guided in a direction of movement of the seat cushion 11 as the slide members 16, 16 move along the guide grooves 28, 28. That is, the guide grooves 28, 28 define a movement locus of the seat cushion 11 between the seating position and the retracted position.

As illustrated in FIG. 8, a lock mechanism 40 according to this disclosure is provided on a flat plane 26c that is located in a lower portion of the front end of the guide wall member 26a formed on the guide groove 28. The lock mechanism 40 is provided on each lateral side of the seat cushion 11. When an excessive load is applied to the seat cushion 11 in the seating position, the lock mechanism 40 locks the seat cushion 11 in the seating position, and restricts the seat cushion 11 from moving rearward. When the seat cushion 11 needs to be moved from the seating position to the retracted position, the lock mechanism 40 unlocks the seat cushion 11 so as to allow it to move to the retracted position.

Figure 9:
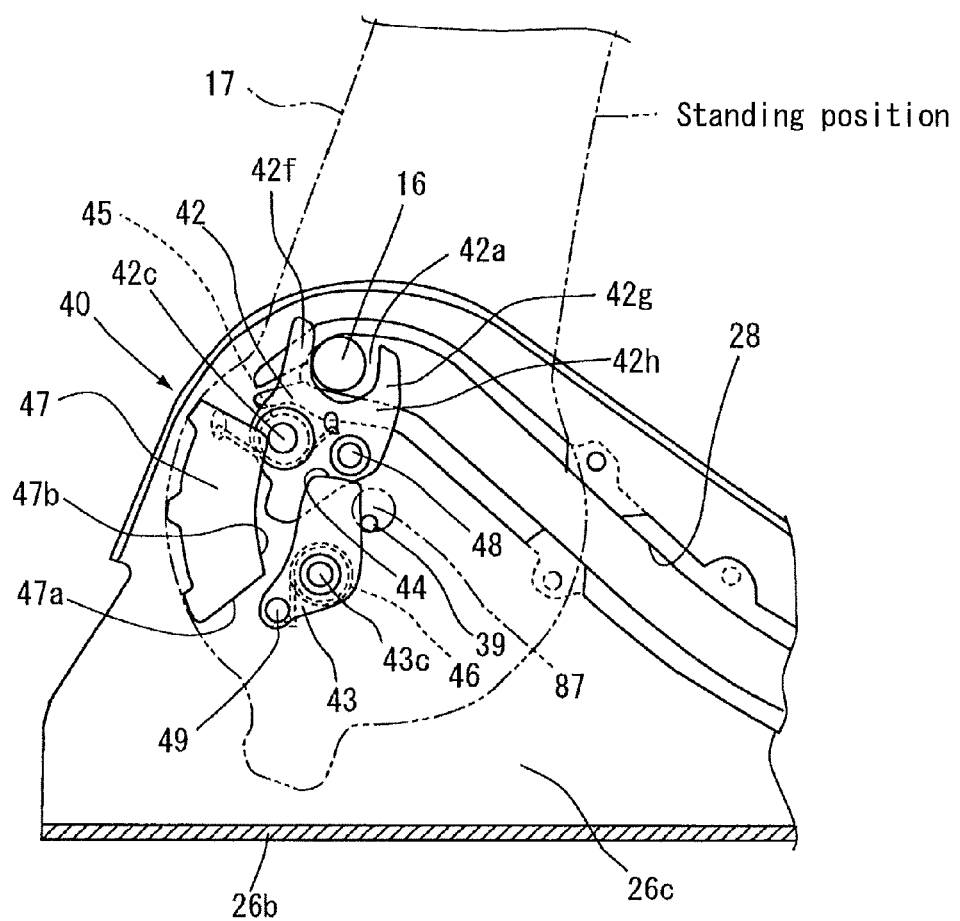
FIG. 9 illustrates the lock mechanism in a normally locked state when the seat cushion is in the seating position.
Figure 10:
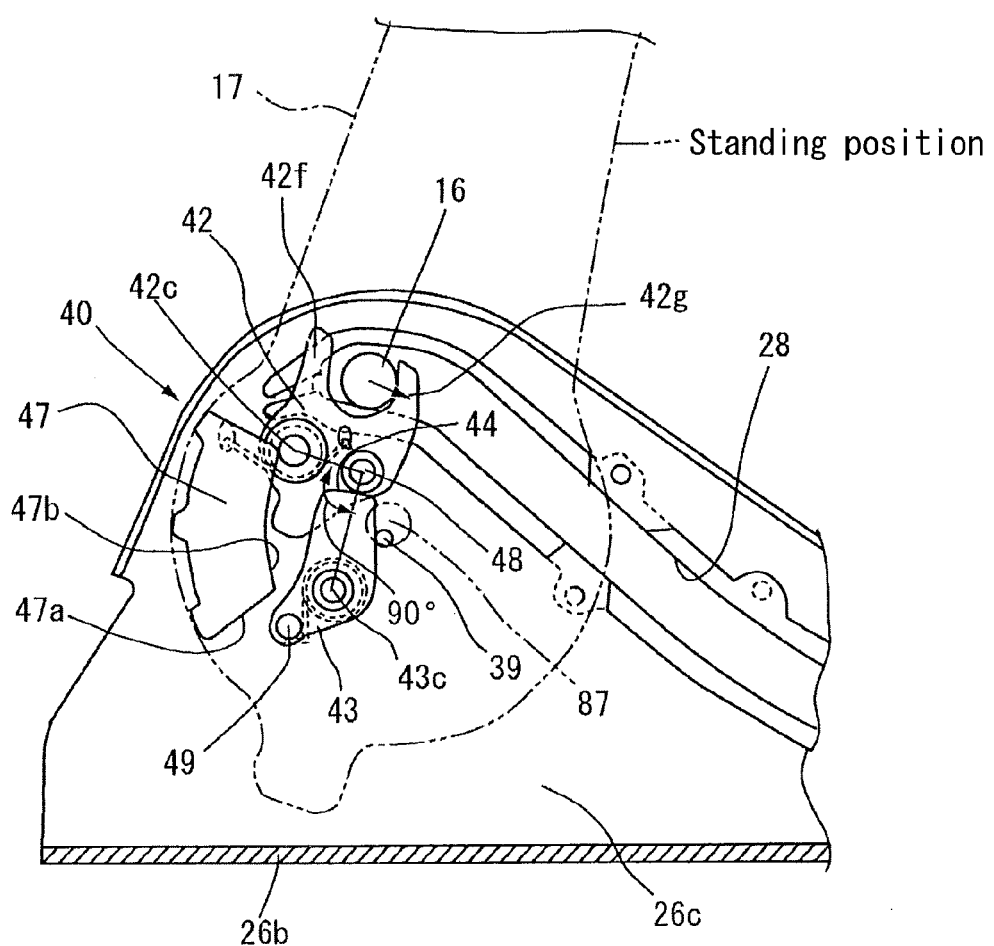
FIG. 10 illustrates the lock mechanism when a large load is applied to the seat cushion.

As shown in FIGS. 8 and 9, the lock mechanism 40 includes a latch 42 pivotably supported on the flat plane 26c by a pivot shaft 42c, a latch engagement member 48 formed integrally with the latch 42 on a flat plane 42h of the latch 42 so as to protrude away from the seat cushion 11, and a latch biasing member 45. The latch biasing member 45 is a torsion coil spring that biases the latch 42 to rotate in a direction from a locked position to an unlocked position (a clockwise direction as shown in FIG. 9).

Figure 13:
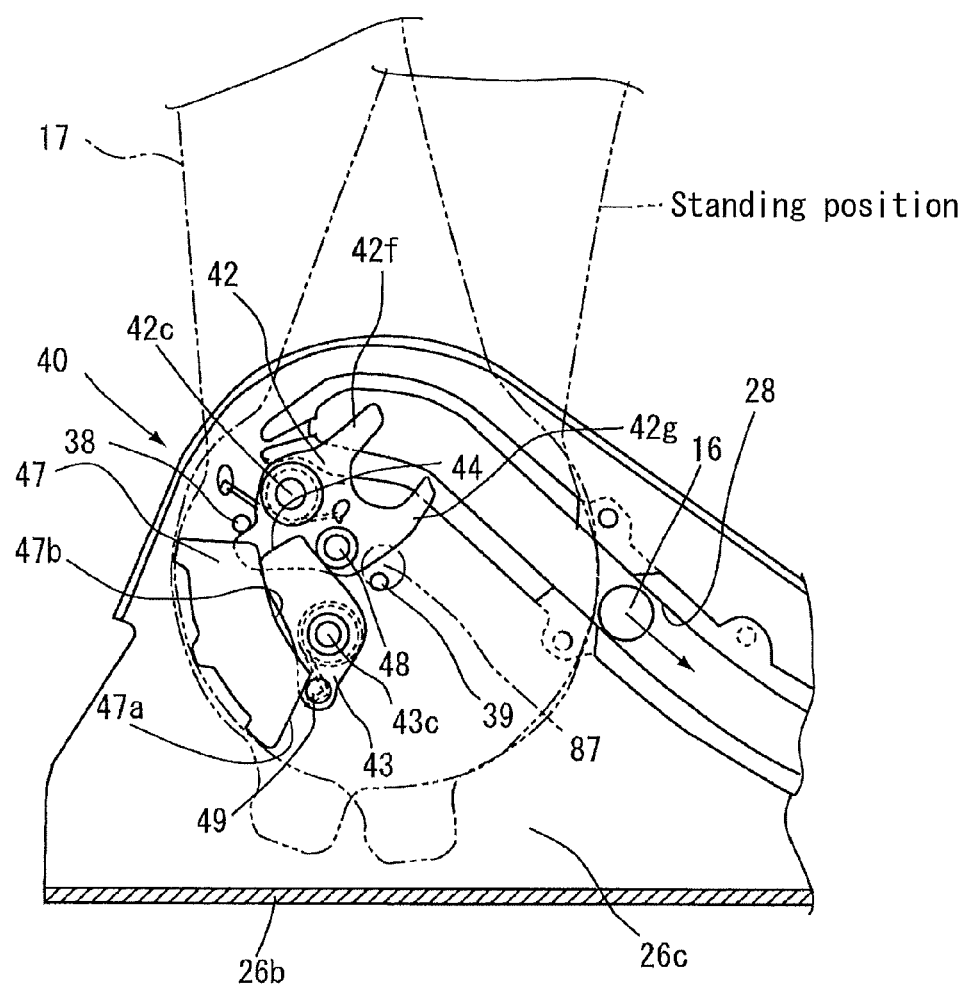
FIG. 13 illustrates the lock mechanism when unlocking is completed.

The locked position of the latch 42 refers to the position of the latch 42 when the seat cushion 11 is in the seating position as shown in FIG. 9. The unlocked position of the latch 42 refers to the position of the latch 42 when the seat cushion 11 is allowed to move to the retracted position as shown in FIG. 13. In the unlocked position, an engagement opening portion 42a of the latch 42 is opened in a direction of a rear end portion of the guide groove 28.

The lock mechanism 40 also includes a pawl 43 pivotably supported at the flat plane 26c below the latch 42 by a pivot shaft 43c, a restricting portion 44 that is formed on an outer circumferential portion of the pawl 43 and that faces an outer circumferential surface of the latch engagement member 48 allowing a slight clearance between the restricting portion 44 and the outer circumferential surface of the latch engagement member 48 when the seat cushion 11 is in the seating position, a pawl engagement member 49 formed integrally with the pawl 43 so as to protrude away from the seat cushion 11, and a pawl biasing member 46. The pawl biasing member 46 is a torsion coil spring that biases the pawl 43 to rotate in a direction from a released position to a restricted position.

Figure 14:
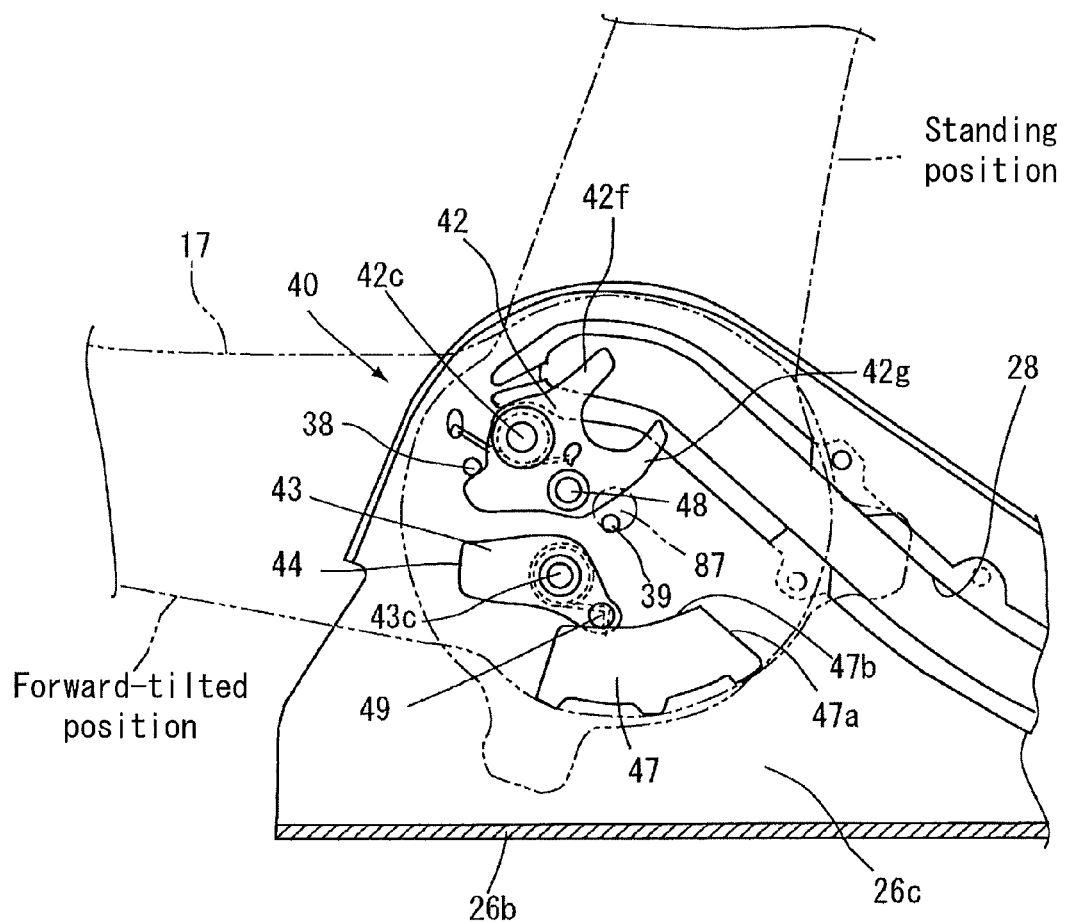
FIG. 14 illustrates the lock mechanism when the seat cushion is in a retracted state.

The restricted position of the pawl 43 refers to the position of the pawl 43 when the latch 42 is in the locked position. The released position of the pawl 3 refers to the position of the pawl 43 as shown in FIG. 14 when the seat cushion 11 is being moved from the seating position to the retracted position or is in the retracted position, and the latch 42 is being moved from the locked position to the unlocked position or is in the unlocked position.

As shown in FIGS. 8 and 9, the lock mechanism 40 also includes a releasing member 47 that is integrally provided on the seat back frame 17. When the seat back frame 17 moves from the standing position to the forward-tilted position, the releasing member 47 pushes an outer circumferential surface of the pawl engagement member 49 so that the pawl 43 is pivoted from the restricted position to the released position, and retains the pawl 43 in the released position.

Next, the lock mechanism 40 will be described in details below. The latch 42 of the lock mechanism 40 is a plate-like member having a predetermined rigidity and is made of, for example, iron or the like. As shown in FIG. 9, the latch 42 includes the engagement opening portion 42a that engages with and disengages from the slide member 16 which moves in the longitudinal direction in the guide groove 28. The engagement opening portion 42a is formed by two protrusions 42f, 42g each provided forward to the engagement opening portion 42a and behind the engagement opening portion 42a with respect to the vehicle's longitudinal direction. The protrusion 42f is formed so as to protrude away from the center of the pivot shaft 42c of the latch 42 by a predetermined length. The protrusion 42g is formed to be substantially parallel to the protrusion 42f so that the two protrusions 42f, 42g provide a space in which the slide member 16 is received and engaged. As described above, the latch engagement member 48 is formed on the flat plane 42h of the latch 42 so as to axially protrude away from the seat cushion 11. The latch engagement member 48 protrudes slightly beyond the pawl 43 that is located axially away from the latch 42.

The latch biasing member 45 of the latch 42 is the torsion coil spring where the coil is wound clockwise in a direction from the front side to the reverse side of the paper on which the FIG. 9 is drawn. One end of the latch biasing member 45, which serves as a locking portion 45a, is bent and fastened into a locking hole provided on the latch 42. The other end of the latch biasing member 45, which serves as a locking portion 45b, is bent and fastened into a locking hole provided on the guide wall member 26a. Thus, the latch biasing member 45 biases the latch 42 to rotate about the pivot shaft 42c clockwise.

The latch 42 is provided with a stopper member 38 for stopping the latch 42 from pivoting clockwise, that is, in a direction of the unlocked position. In this embodiment, a pin fastened to the guide wall member 26a serves as the stopper member 38, however, any types of the stopper member that stops the latch 42 from pivoting may be used.

The pawl 43 is arranged parallel to the latch 42 in a manner that the latch 42 is located between the pawl 43 and the seat cushion 11 with respect to the lateral direction of the seat cushion 11. A distance between the pawl 43 and the latch 42 causes no interference therebetween, and at the same time, the distance causes the latch engagement member 48 of the latch 42 and the restricting portion 44 of the pawl 43 to contact with each other when each of the pawl 43 and the latch 42 is pivoted.

When the excessive load is applied to the seat cushion 11, the pawl 43 in the restricted position receives the load via the slide member 16 provided on the seat cushion 11 and via the engagement portion 48 of the latch 42 in the locked position, and restricts the latch 42 from pivoting in the direction to the unlocked position. In other words, the pawl 43 restricts the seat cushion 11 from moving rearward. Therefore, the pawl 43 is the plate-like member having the high rigidity and is made of, for example, iron or the like. The pivot shaft 43c, which pivotably supports the pawl 43, is located below and behind the pivot shaft 42c of the latch 42. The latch 42 and the pawl 43 are arranged so that a first line and a second line forms a substantially right angle when the latch engagement member 48 and the restricting portion 44 of the pawl 43 face and contact with each other. The first line connects the center of the pivot shaft 42c of the latch 42 with a position where the latch engagement member 48 and the restricting portion 44 face each other (that is, a vicinity of the center of the latch engagement member 48), and the second line connects the center of the pivot shaft 43c of the pawl 43 with the position where the latch engagement member 48 and the restricting portion 44 face each other (that is, the vicinity of the center of the latch engagement member 48).

The pawl 43 is provided with the pawl biasing member 46 whose axis line corresponds to the pivot shaft 43c of the pawl 43. The pawl biasing member 46 is the torsion coil spring where the coil is wound clockwise in the direction from the front side to the reverse side of the paper on which the FIG. 9 is drawn. One end of the pawl biasing member 46, which serves as a locking portion 46a, is bent and fastened to a stopper pin provided on a lateral surface, which faces the seat cushion 11, of the pawl 43. The other end of the pawl biasing member 46, which serves as a locking portion 46b, is bent and fastened into a notch hole formed on the flat plane 26c of the guide rail member 26a. Thus, the pawl biasing member 46 biases the pawl 43 to pivot about the pivot shaft 43c clockwise from the released position to the restricted position.

The pawl 43 is provided with a stopper member 39 for stopping the pawl 43 from pivoting in the clockwise direction in FIG. 9, that is, in a direction of the restricted position. In this embodiment, a pin fastened to the guide wall member 26a serves as the stopper member 39, however, any types of the stopper member that is located in a predefined position and that stops the pawl 43 from pivoting may be used.

When the seat cushion 11 is unlocked, the releasing member 47 pivots in the counterclockwise direction in FIG. 9 as the side portion 17a pivots to tilt forward. The releasing member 47 includes an engagement surface 47a and a curved retaining surface 47b. The engagement surface 47a is set to be long enough in the radial direction to push the outer circumferential surface of the pawl engagement member 49 of the pawl 43 that is in the restricted position when the seat cushion 11 is being unlocked. When the pawl 43 is in the released position after passing through the restricted position, the curved retaining surface 47b retains the pawl engagement member 49 in place so that the pawl 43 stays in the released position.

When the seat back frame 17 is in the standing position, the releasing member 47 is located forward to the pivot center of the side portion 17a of the seat back frame 17. The releasing member 47 has a shape that is formed by cutting a circumferential portion away from a ring whose center corresponds to the pivot center of the side portion 17a. The releasing member 47 refers to a portion of an outer periphery of the side portion 17a, which extends toward the seat cushion 11 at a right angle and then extends toward the pivot center of the seat back frame 17 so as to be in contact with the outer circumferential surface of the pawl engagement member 49 of the pawl 43.

In the lock mechanism 40 having the above described structure, the latch 42, where the slide member 16 engages with the engagement opening portion 42a opening upward, is located above the pawl 43. Further, the latch 42, the pawl 43 and the releasing member 47 are arranged in a manner that at least two of the latch 42, the pawl 43 and the releasing member 47 are partly overlapped with each other in the lateral direction of the vehicle when at least one of the latch 42, the pawl 43 and the releasing member 47 is pivoting, and when none of the latch 42, the pawl 43 and the releasing member 47 is pivoting.

Next, an operation of the seat cushion 11 and the seat back 12 actuated by the first drive unit 5 and the second drive unit 6 respectively will be described below.

When an operation switch is turned on when the seat cushion 11 is in the seating position, first, the drive unit 6 causes the second electric motor 100 to rotate for actuating the seat cushion 11, and thus the seat cushion 11 starts moving rearward from the seating position to the retracted position. Then, thereafter, the drive unit 5 causes the first electric motor 80 to rotate for actuating the seat back 12, and thus the seat back 12 starts pivoting from the standing position to the forward-tilted position. As described above, the seat back 12 pivots about the pivot center of the seat back 12 slightly eccentrically with respect to the seat cushion 11. The control unit 3 adjusts the first electric motor 80 and the second electric motor 100 in terms of an actuation timing and a driving speed so that the seat cushion 11 and the seat back 12 do not interfere with each other when being moved.

When a return operation switch is turned on when the seat cushion 11 is in the retracted position and the seat back 12 is in the forward-tilted position, the first electric motor 80 and the second electric motor 100 rotate in the reverse direction, thereby moving the seat cushion 11 from the retracted position to the seating position, and pivoting the seat back 12 from the forward-tilted position to the standing position without causing interference between the seat cushion 11 and the seat back 12. Instead of providing the two different switches (that is, the operation switch and the return operation switch) as described above, a single switch may be provided for operating the seat cushion 11 between the seating position and the retracted position and operating the seat back 12 between the standing position and the forward-tilted position regardless of directions of operation. Again, the actuation timing and the driving speed of the first electric motor 80 and the second electric motor 100 are adjusted.

Next, an operation of the lock mechanism 40 will be described below with reference to FIGS. 9 to 14. First, the operation of the lock mechanism 40 when a large load due to a rear-end collision or the like is applied to the seat cushion 11 that is locked in the seating position will be described.

When the seat cushion 11 is in the seating position with no large load applied thereto, that is, in a normally locked state, each of the slide members 16, 16 is in contact with the front end portion of the guide groove 28 and is retained in this state by means of a rotary force of the second electric motor 100 of the drive unit 6 and by means of the engagement of related gears, and thus the seat cushion 11 is restricted from moving in the longitudinal direction. At this time, the latch 42 is secured in the locked position as the slide member 16 pushes forward a rear end face of the protrusion 42f that forms the engagement opening portion 42a. The latch engagement member 48 and the restricting portion 44 of the pawl 43 face each other leaving a slight clearance therebetween.

When the large load is applied to the seat cushion 11 under the above-described condition, the engagement of the related gears of the second drive unit 6 may not retain the slide members 16, 16 in the above-described secured state, and then the slide members 16, 16 may move rearward in the guide grooves 28, 28, and consequently the seat cushion 11 may move rearward. Each slide member 16 moves rearward and collides with a front end face of the protrusion 42g that is located in the rear portion of the latch 42, and thus the latch 42 pivots about the pivot shaft 43c by an amount that corresponds to the slight clearance between the latch engagement member 48 of the latch 42 and the restricting portion 44 of the pawl 43. As a result, the latch engagement member 48 collides with the restricting portion 44 of the pawl 43.

However, the lock mechanism 40 is structured so that the first line connecting the center of the pivot shaft 42c of the latch 42 with the position where the latch engagement member 48 and the restricting portion 44 face each other, and the second line connecting the center of the pivot shaft 43c of the pawl 43 with the position where the latch engagement member 48 and the restricting portion 44 face each other make the substantially right angle, therefore a load is transmitted from the latch 42 to the pawl 43 via the center of the pivot shaft 43c of the pawl 43. Consequently, the pivot shaft 43c of the pawl 43 reliably receives the load transmitted from the latch 42 without being pivoted and restricts the latch 42 from pivoting in the direction of the unlocked position in a stable manner.

Next, an operation of unlocking the seat cushion 11 that is locked by means of the lock mechanism 40 in the seating position will be described. To unlock the seat cushion 11, the pawl 43 is pivoted counterclockwise by the releasing member 47 so that a state where the latch engagement member 48 of the latch 42 and the restricting portion 44 of the 43 are in contact with each other is cleared.

Figure 11:
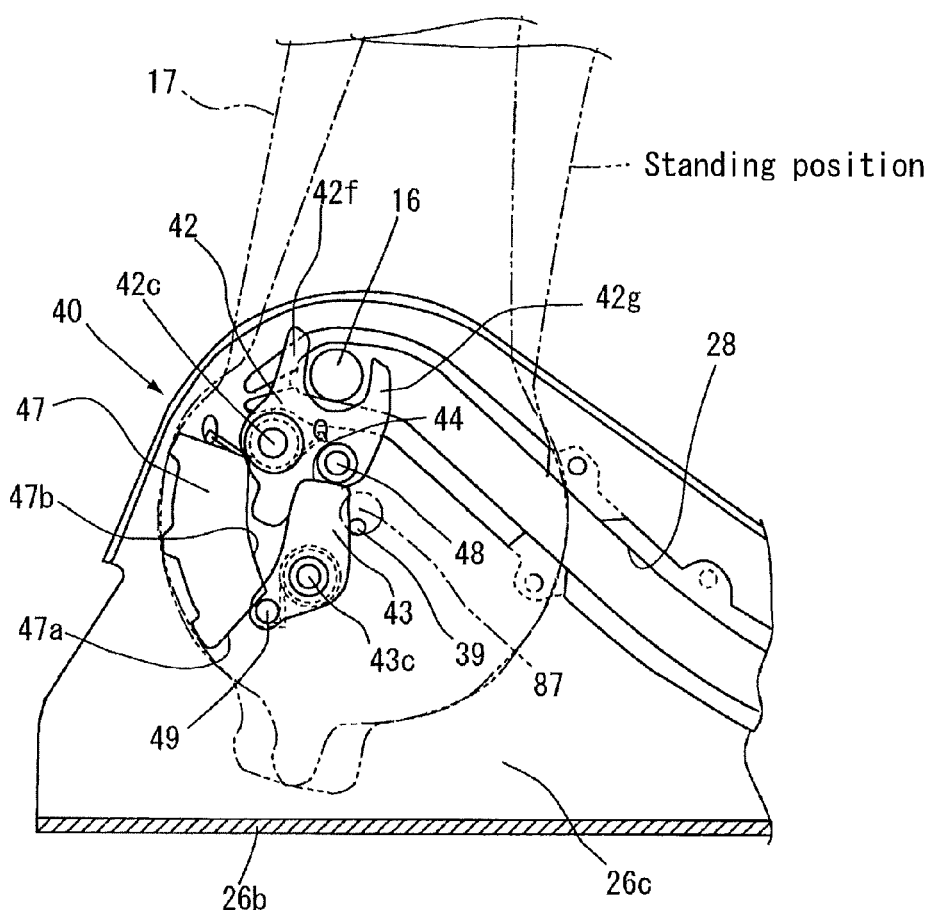
FIG. 11 illustrates the lock mechanism when unlocking starts.

First, the operation switch is turned on and the side portion 17a of the seat back 12, which is in the standing position and moves in conjunction with the releasing member 47, is tilted forward by means of the first drive unit 5 (refer to FIG. 11). At the same time, or a while after that, the seat cushion 11 starts to be driven to move in the direction of the retracted position by the second drive unit 6. The timings of operating the seat back frame 17 and the seat cushion 11 are adjusted and controlled by the control unit 3 so that the seat back frame 17 and the seat cushion 11 do not interfere with each other.

Figure 12:
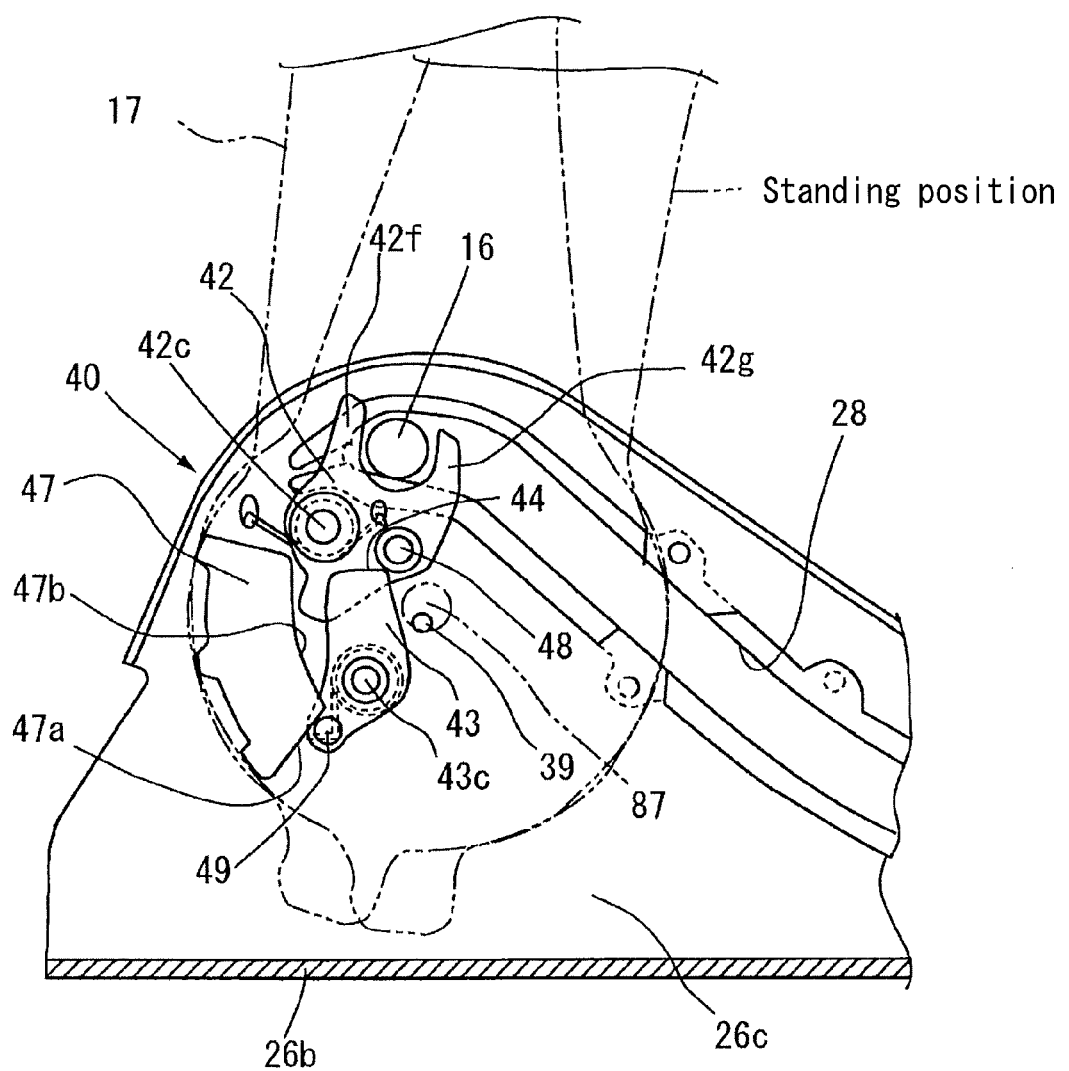
FIG. 12 illustrates an unlocking point of the lock mechanism.

Then, as shown in FIG. 11, the releasing member 47 pivots about the pivot center of the seat back 12 and the engagement surface 47a comes in contact with the outer circumferential surface of the pawl engagement member 49 of the pawl 43. At this time, the releasing member 47 and the seat back 12 pivot about the shaft 87 in a slightly eccentric manner with respect to the shaft 87. However, the releasing member 47 is formed so as to allow the engagement surface 47a to have the predetermined length, therefore the engagement surface 47a reliably comes in contact with the outer circumferential surface of the pawl engagement member 49. When the seat back 12 is further tilted forward, the pawl engagement portion 49 is pushed by the engagement surface 47a, and thus the pawl 43 pivots about the pivot shaft 43c toward the released position. When the seat back 12 is still further tilted forward, the latch 42 and the pawl 43 reach an unlocking point as shown in FIG. 12 where the latch engagement portion 48 of the latch 42 comes apart from the restricting portion 44 of the pawl 43. By this time, the latch 42 has been pivoted toward the unlocked position by a predetermined angle as shown in FIG. 12. As the latch 42 pivots, the seat cushion 11 moves rearward toward the retracted position, and the slide member 16 is controlled so as not to engage with the engagement opening portion 42a of the latch 42 and therefore not to prevent the latch 42 from pivoting. When the seat back 12 is further tilted forward, the latch 42 reaches the unlocked position as shown in FIG. 13, and the engagement opening portion 42a comes to be oriented to open in the direction of the guide groove 28, that is, in the direction of the retracted position of the seat cushion 11. Thus, the seat cushion 11 is unlocked.

When the seat back 12 is further tilted forward, the pawl engagement member 49 that is in contact with the engagement surface 47a of the releasing member 47 moves so as to come in contact with the curved retaining surface 47b of the releasing member 47 as shown in FIG. 14. Then, the pawl 43 is biased by the pawl biasing member 46 so that the pawl engagement member 49 is pushed against the curved retaining surface 47b of the releasing member 47, and thus the releasing member 47 is stably retained in the released position.

After the seat cushion 11 is unlocked accordingly, the seat cushion 11 is moved to the retracted position while the slide member 16 is guided rearward by the guide groove 28, and the seat back 12 is fully forward tilted. Thus, the seat 10 is retracted.

Next, an operation of moving the seat cushion 11 from the retracted position to the seating position will be described. First, the seat back 12 starts pivoting from the forward-tilted position toward the standing position when the return operation switch is turned on. The releasing member 47, which moves in conjunction with the seat back 12, therefore starts pivoting clockwise about the shaft 87 of the seat back 12. When the releasing member 47 further pivots, the pawl engagement member 49 of the pawl 43, which has been pushing the curved retaining surface 47b of the releasing member 47, comes apart from the curved retaining surface 47b and comes in contact with the engagement surface 47a (refer to FIG. 13).

When the releasing member 47 further pivots clockwise and the pawl 43 pivots clockwise toward the restricted position, the latch engagement member 48 of the latch 42 comes in contact with a side wall of the pawl 43, that is, the outer circumferential portion of the pawl 43, which is perpendicular to the restricting portion 44 of the pawl 43. When the pawl 43 further pivots toward the restricted position, the latch engagement member 48 of the latch 42 passes through an unlock starting point (that is, the unlock point) and comes in contact with the restricting portion 44 of the pawl 43 in a manner that the latch engagement member 48 rides on the restricting portion 44, and thus the locked position is reached. At this time, the seat cushion 11 is driven by the second drive unit 6 and moved forward before the latch 42 comes to be in the locked position. At the same time, the slide member 16 comes to be engageably received by the latch engagement opening portion 42a that is opened in the direction of the retracted position of the guide groove 28. Then the slide member 16 stops, pushing forward the rear end face of the protrusion 42f of the engagement opening portion 42a and the front end portion of the guide groove 28.

As is clear from the above description, in this embodiment, when a load in the direction of the retracted position is applied to the seat cushion 11 that is in the seating position, the latch engagement member 48 of the latch 42, which pivots in conjunction with the seat cushion 11, comes in contact with the restricting portion 44 of the pawl 43, and the latch 42 is prevented from pivoting, that is, the seat cushion 11 is locked, and restricted from moving in the retracted position. When unlocking the seat cushion 11, the releasing member 47, which pivots in conjunction with the seat back 12 that tilts forward, pushes the pawl engagement member 49 to cause the pawl 43 to pivot so that the latch engagement portion 48 of the latch 42 comes apart from the restricting portion 44 of the pawl 43. Thus, the seat cushion 11 is locked and unlocked by means of a simple structure that is achieved at a low cost without providing an unlock electric motor. Therefore, the size of the lock mechanism is reduced, which provides a design flexibility. Further, when the seat cushion 11 is in the seating position, in the normally locked state, each of the slide members 16, 16 is in contact with the front end portion of the guide groove 28 and is retained in this state by means of the second drive unit 6, and thus the seat cushion 11 is locked.

Consequently, the clearance is allowed between the latch engagement member 48 and the restricting portion 44 of the pawl 43, which improves assemblability by absorbing variation generated during assembly.

In this embodiment, when the latch engagement member 48 and the restricting portion 44 of the pawl 43 contact each other and thus the latch 42 is restricted from pivoting, a pivoting load of the latch 42 that is applied to the pawl 43 via the latch engagement member 48 passes through the center of the pivot shaft 43c of the pawl 43. Consequently, when the large load is applied to the seat cushion frame 13, the pawl 43 stably receives the large load without being pivoted, thereby reliably preventing the seat cushion frame 13 from moving in the direction of the retracted position.

In this embodiment, when the seat cushion 11 is in the seating position, the slide member 16 of the seat cushion 11 is positioned top most, the pawl 43 is positioned bottom most, and the latch 42 is vertically interposed between the slide member 16 and the pawl 43. Consequently, the slide member 16 is supported by the latch 42 from underneath in a cantilever-like manner and retained in the engagement opening portion 42a, which saves space above the slide member 16. In addition, the latch 42, the pawl 43 and the releasing member 47 are arranged in the manner that at least one of the latch 42, the pawl 43 and the releasing member 47 is partly overlapped with at least another one of the latch 42, the pawl 43 and the releasing member 47 in the lateral direction of the vehicle. Consequently, the lock mechanism 40 may be mounted in a small space with respect to the vertical direction of the vehicle, which further saves space.

In this embodiment, the first drive unit 5 is provided on only one of the seat back frames 17a, 17a for actuating the seat back 12 to move. However, for example, a drive force of the first drive unit 5 may be transmitted to the other one of the seat back frames 17a, 17a via a torque rod connecting the two seat back frames 17a, 17a for actuating the seat back 12 to tilt forward.

In the embodiment, the disclosure is applied to the rear most seat of a station wagon, a minivan, and the like. This disclosure, however, may be applied to the seat for a vehicle of other types.

According to the disclosure, when the load in the direction of the retracted position is applied to the seat cushion frame 13 that is in the seating position, the latch engagement member 48 of the latch 42, which pivots as the seat cushion frame 13 pivots, comes in contact with restricting portion 44 of the pawl 43, and the latch 42 is prevented from pivoting, that is, the seat cushion frame 13 is locked, and restricted from moving in the retracted position. When unlocking the seat cushion frame 13, the releasing member 47, which pivots in conjunction with the seat back 12 that tilts forward, pushes the pawl engagement member 49 so that the latch engagement portion 48 of the latch 42 comes apart from the restricting portion 44 of the pawl 43. Thus, the seat cushion frame 13 is locked and unlocked by means of the simple structure that is achieved at a low cost without providing the unlock electric motor. Therefore, a reduction in the size of the lock mechanism is achieved, thereby improving design flexibility.

Further, when the seat cushion frame 13 is in the seating position in the normally locked state, the seat cushion frame 13 is secured in the seating position by means of the engagement of the gears established by the second electric motor 100, and each of the slide members 16, 16 is in contact with the front end portion of the guide groove 28, and thus the seat cushion frame 13 is locked. Consequently, when the seat cushion frame 13 is in the seating position in the normally locked state, the clearance is allowed between the latch engagement member 48 and the restricting portion 44 of the pawl 43, which improves assemblability by absorbing variation generated during assembly.

According to the disclosure, the first line connecting the position where the latch engagement member 48 and the restricting portion 44 face each other with the center of the pivot shaft 42c of the latch 42, and the second line connecting the position where the latch engagement member 48 and the restricting portion 44 face each other with the center of the pivot center 43c of the pawl 43 form the substantial right angle when the latch 42 is in the locked position and the pawl 43 is in the restricted position.

Consequently, when the latch engagement member 48 and the restricting portion 44 of the pawl 43 contact each other and thus the latch 42 is restricted from pivoting, the pivoting load of the latch 42 that is applied to the pawl 43 via the latch engagement member 48 passes through the center of the pivot shaft 43c of the pawl 43. Thus, when the large load is applied to the seat cushion frame 13, the pawl 43 stably receives the large load without being pivoted, thereby reliably preventing the seat cushion frame 13 from moving in the direction of the retracted position.

According to the disclosure, the slide member 16 is positioned top most, the pawl 43 is positioned bottom most, and the latch 42 is vertically interposed between the slide member 16 and the pawl 43 when the slide member 16 is locked at the one of the end portions of the guide groove 28 which is located more proximate to the seating position, and the latch 42, the pawl 43 and the releasing member 47 are arranged in the manner that at least one of the latch 42, the pawl 43 and the releasing member 47 is partly overlapped with at least another one of the latch 42, the pawl 43 and the releasing member 47 in the lateral direction of the vehicle when at least one of or none of the latch 42, the pawl 43 and the releasing member 47 is pivoting.

Consequently, when the seat cushion 11 is in the seating position, the slide member 16 of the seat cushion 11 is positioned top most, the pawl 43 is positioned bottom most, and the latch 42 is vertically interposed between the slide member 16 and the pawl 43. Consequently, the slide member 16 is supported by the latch 42 from underneath in the cantilever-like manner and retained in the engagement opening portion 42a, which saves the space above the slide member 16.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A lock mechanism for an electric retractable seat for a vehicle, comprising:
   a seat cushion frame reciprocately moving between a seating position and a retracted position by a driving of a second electric motor;
   a seat back frame pivoting between a standing position and a forward-tilted position by a driving of a first electric motor;
   a first link and a second link positioned respectively at a first end portion of the seat cushion frame and a second end portion of the seat cushion frame in a lateral direction of the vehicle, each of the first and second links possessing an end adapted to be pivotably connected to a vehicle floor and each of the first and second links possessing another end connected to a front portion of the seat cushion frame;

a guide member adapted to be arranged on the vehicle floor, and including a guide groove formed to extend between the seating position and the retracted position and a guide wall member formed along a longitudinal direction of the vehicle;

a slide member arranged at a rear end portion of the seat cushion frame and slidably engaging with the guide groove formed on the guide member;

a latch supported at the guide wall member in a pivotable manner between an unlocked position and a locked position and including an engagement opening portion engaging with and disengaging from the slide member;

the slide member disengaging from the engagement opening portion when the latch is in the unlocked position;

the slide member engaging with the engagement opening portion and pivoting the latch to the locked position during a movement of the seat cushion frame to the seating position;

the slide member being locked between a first end portion of the guide groove which is located more proximate to the seating position than a second end portion of the guide groove and the engagement opening portion when the latch is in the locked position;

a latch engagement member formed integrally with the latch;

a latch biasing member biasing the latch in a direction from the lock position to the unlocked position;

a pawl supported at the guide wall member in a pivotable manner between a restricted position and a released position and including a restricting portion;

the restricting portion facing the latch engagement member leaving a space therebetween for restricting the latch in the locked position from pivoting in a direction to the unlocked position when the pawl is in the restricted position;

the restricting portion allowing the latch to pivot in the direction to the unlocked position when the pawl is in the released position;

a pawl engagement member formed integrally with the pawl;

a pawl biasing member biasing the pawl in a direction from the released position to the restricted position; and a releasing member provided on the seat back frame and pushing the pawl engagement member to rotate the pawl to the released position and retain the pawl in the released position while the seat back frame is pivoting from the standing position to the forward-tilted position.

2. A lock mechanism for an electric retractable seat for a vehicle according to claim 1, further comprising a first line connecting a position where the latch engagement member and the restricting portion face each other with the center of a pivot shaft of the latch, and a second line connecting the position where the latch engagement member and the restricting portion face each other with the center of a pivot center of the pawl, wherein the first line and the second line form a substantial right angle when the latch is in the locked position and the pawl is in the restricted position.

3. A lock mechanism for an electric retractable seat for a vehicle according to claim 1, wherein the slide member is positioned top most, the pawl is positioned bottom most, and the latch is vertically interposed between the slide member and the pawl when the slide member is locked at the first end portion of the guide groove which is located more proximate to the seating position, and the latch, the pawl and the releasing member are arranged in a manner that at least one of the latch, the pawl and the releasing member is partly overlapped with at least another one of the latch, the pawl and the releasing member in a lateral direction of the vehicle.

4. A lock mechanism for an electric retractable seat for a vehicle according to claim 2, wherein the slide member is positioned top most, the pawl is positioned bottom most, and the latch is vertically interposed between the slide member and the pawl when the slide member is locked at the first end portion of the guide groove which is located more proximate to the seating position, and the latch, the pawl and the releasing member are arranged in a manner that at least one of the latch, the pawl and the releasing member is partly overlapped with at least another one of the latch, the pawl and the releasing member in a lateral direction of the vehicle.

* * * * *